(12) United States Patent
Sulejmani

(10) Patent No.: US 10,433,492 B2
(45) Date of Patent: Oct. 8, 2019

(54) METHOD FOR INCREASING THE YIELD OF A FLOWERING PLANT

(71) Applicant: Sulejmani Holdings, LLC, Livonia, MI (US)

(72) Inventor: Memet Sulejmani, Livonia, MI (US)

(73) Assignee: Sulejmani Holdings, LLC, Livonia, MI (US)

(*) Notice: Subject to any disclaimer, the term of this patent is extended or adjusted under 35 U.S.C. 154(b) by 226 days.

(21) Appl. No.: 15/511,527

(22) PCT Filed: Sep. 17, 2015

(86) PCT No.: PCT/US2015/050611
§ 371 (c)(1),
(2) Date: Mar. 15, 2017

(87) PCT Pub. No.: WO2016/044541
PCT Pub. Date: Mar. 24, 2016

(65) Prior Publication Data
US 2017/0290274 A1 Oct. 12, 2017

Related U.S. Application Data

(60) Provisional application No. 62/051,593, filed on Sep. 17, 2014.

(51) Int. Cl.
*A01G 7/04* (2006.01)
*F21V 21/088* (2006.01)
(Continued)

(52) U.S. Cl.
CPC ............ *A01G 7/045* (2013.01); *F21V 21/088* (2013.01); *F21Y 2103/33* (2016.08); *F21Y 2115/10* (2016.08); *Y02P 60/146* (2015.11)

(58) Field of Classification Search
CPC . A01G 7/045; A01G 7/04; A01G 9/20; A01G 9/249; A01G 9/12; A01G 9/128;
(Continued)

(56) References Cited

U.S. PATENT DOCUMENTS

| 4,662,106 A * | 5/1987 | Mori | A01G 7/045 47/17 |
| 7,401,936 B1 * | 7/2008 | Fan | A45B 3/04 362/102 |

(Continued)

FOREIGN PATENT DOCUMENTS

| JP | 2007267645 A | 10/2007 |
| WO | WO2013131024 A1 | 9/2013 |
| WO | WO2014013400 A2 | 1/2014 |

OTHER PUBLICATIONS

"Home Grow Homie, 3 Types of Marijuana Grow Lights. Which will yield the biggest Crop?, 2011, How-to-nnarijuana.com" (Year: 2011).*

(Continued)

*Primary Examiner* — Kathleen I Alker
(74) *Attorney, Agent, or Firm* — Quinn IP Law

(57) ABSTRACT

A method for increasing the yield of a flowering plant includes positioning a lighting device with respect to a lower minor height of the flowering plant, i.e., at a height of less than half of the plant's total height. The method includes irradiating the lower minor height of the plant with light in a predetermined range of the electromagnetic spectrum for a duration of a flowering stage of a life cycle of the flowering plant. The lighting device may be an annular clamshell design that circumscribes a stalk of the flowering plant. Such a design may be clamped to the stalk via a spring force of a pair of spring-loaded clamps. The lighting device may include a plurality of ref LEDs arranged in an arcuate manner. At least 80 percent of the light from the lighting (Continued)

device is in the predetermined range of 580 nm to 780 nm, and may be in the range of 600 nm to 700 nm.

16 Claims, 7 Drawing Sheets

(51) Int. Cl.
*F21Y 103/33* (2016.01)
*F21Y 115/10* (2016.01)

(58) Field of Classification Search
CPC .. A01G 17/04; A01G 17/06; A01G 2017/065; A01G 17/10; A01G 17/12; A01G 17/14; F21V 21/088; F21V 21/0885
USPC .................................................. 47/58.1 LS
See application file for complete search history.

(56) References Cited

U.S. PATENT DOCUMENTS

| | | | | |
|---|---|---|---|---|
| 8,444,104 | B2* | 5/2013 | Li | A45B 3/04 135/16 |
| 8,458,954 | B2* | 6/2013 | Yamada | A01G 7/045 250/504 R |
| 9,851,062 | B1* | 12/2017 | Davis | F21S 2/005 |
| 10,117,385 | B2* | 11/2018 | Jenner | A01G 7/045 |
| 2007/0133191 | A1* | 6/2007 | Ma | A45B 3/04 362/102 |
| 2010/0008081 | A1* | 1/2010 | Canino | A01G 9/26 362/191 |
| 2010/0287830 | A1 | 11/2010 | Chen et al. | |
| 2012/0038293 | A1* | 2/2012 | Guerrieri | F21S 9/02 315/313 |
| 2012/0281413 | A1* | 11/2012 | Lewis | A01G 7/045 362/249.11 |
| 2013/0139437 | A1 | 6/2013 | Maxik et al. | |
| 2013/0301258 | A1* | 11/2013 | Aoki | A61L 2/084 362/231 |
| 2015/0128489 | A1* | 5/2015 | Yamada | A01G 7/045 47/58.1 LS |
| 2015/0181811 | A1* | 7/2015 | Krijn | A01G 7/045 47/58.1 LS |
| 2016/0242370 | A1* | 8/2016 | Kidakarn | A01G 27/02 |

OTHER PUBLICATIONS

"Derann et al, Supplemental Lighting Orientation and Red-to-blue Ratio of Light-emitting Diodes for Greenhouse Tomato Production, 2014, HortScience, 49(4):488-452" (Year: 2014).*

* cited by examiner

METHOD FOR INCREASING THE YIELD OF A FLOWERING PLANT

CROSS-REFERENCE TO RELATED APPLICATIONS

This application is a United States National Stage application of, and therefore claims the benefit of, International Application No. PCT/US2015/050611 filed Sep. 17, 2015, which claims the benefit of U.S. Provisional Application No. 62/051,593 filed Sep. 17, 2014, both of which are hereby incorporated by reference in their respective entireties.

TECHNICAL FIELD

The present disclosure relates to a method for increasing the yield of a flowering plant.

BACKGROUND

Flowering plants grow from a seed into a fully mature plant in a progressive series of lifecycle stages. Depending on the plant variety, such lifestyle stages typically include germination, seedling, vegetative growth, bloom/flowering, and harvest. Common examples of flowering plants include fruit-producing varieties such as tomato plants as well as floral plants such as orchids and lilies. Cannabis is another example of a rapidly growing type of flowering plant, one whose floral blooms or buds can be consumed. Such a plant can progress through its entire lifecycle in about 4-10 months.

As disclosed in U.S. Pat. No. 6,630,507 to Hampson et al., as originally assigned to the United States of America as Represented by The Department of Health and Human Services, the cannabinoids found in cannabis plants have certain antioxidant properties that are useful in the treatment of a variety of inflammatory, autoimmune, and other diseases. Medically-prescribed cannabis/marijuana is therefore growing as a government-regulated alternative means for relieving the symptoms of debilitating diseases. Some government entities also permit the limited sale and use of small amounts of marijuana for recreational use. As a result, a nascent but growing industry of cannabis cultivation devices and methodologies has emerged.

The flowering stage of growth is of particular importance to the cultivation of cannabis and other flowering plants having a similar lifecycle. During the flowering stage of the life cycle, male plants produce the pollen needed for fertilization of the floral blooms or buds of the female plants. The pollinated flowers in turn produce the seeds necessary for germinating another plant, thus ensuring the longevity of a particular crop of plants. With respect to cannabis in particular, the flowers of any non-pollinated female plants are carefully harvested, dried, and cured. The buds are then processed for human consumption. Therefore, a substantial bud yield during the flowering stage of a plant's lifecycle is desirable. However, existing methods for the cultivation of cannabis and other flowering plants may be less than optimal in terms of maximizing such a yield.

For instance, conventional methods of cultivation include the use of broad-spectrum lighting panels, which is typically achieved via the use of bright overhead "grow light" panels, natural sunlight, or multi-spectral bands of light such as the blue-red spectrum. Compact fluorescent lamps, metal halide, high-pressure sodium grow lights, and light-emitting diode panels are examples of conventional lighting panels. Such lighting panels are typically positioned a few inches to a few feet above the canopy of the plant, and are used throughout the entirety of the vegetative and flowering stages of the plant's life cycle. However, such panels may be less than optimal in terms of floral yield, i.e., the amount or volume of floral buds or blooms produced by the flowering plant.

SUMMARY

A method is disclosed herein for increasing the floral yield of a flowering plant. In an example embodiment, the method includes irradiating a lower minor height of the flowering plant, for instance irradiating the flowering plant along the lower half or lower third of the plant's overall height, during substantially all of a duration of the flowering stage of the plant's lifecycle. The method, when conducted as set forth herein, is intended to increase the number and/or quality of floral blooms or buds relative to conventional overhead broad-spectrum lighting techniques of the types noted above.

Low relative power consumption is a potential problem with conventional full-spectrum lighting, such as blue/red LED grow lighting panels. While low power consumption makes LED lighting panel technologies in particular an energy efficient lighting option, it is recognized herein that low power consumption can potentially result in a lack of light penetration through the full canopy of the flowering plant. Plant growth is rapid during the flowering stage of the plant's lifecycle, during which, depending on the plant variety, the canopy can quickly reach a height above soil level of at least 2-4 feet. As a result of such limitations, conventional growing processes tend to require extensive pruning of the lower portions of the flowering plant. This in turn can stress the plant and lead to stunted growth and low yield of the floral blooms or buds. The present method is therefore intended to address such cultivation problems of cannabis and other flowering plants having a similar lifecycle.

An embodiment of the present method includes irradiating the flowering plant, via a lighting device, along a lower minor height of the flowering plant device. The plant is irradiated with a calibrated band of light during the flowering stage of the plant's lifecycle. For instance, the lower minor height, i.e., the lower half or third of the overall height of the plant, may be irradiated with the light from underneath foliage of the plant, with about 80 percent or more of such light falling within the 580 nm to 780 nm range of wavelengths. In other embodiments, the range may be 585 nm to 740 nm, or a narrower range of 600 nm to 700 nm. For optimal performance, 95 percent or more of the light should fall within the defined ranges. Additionally, such light may have a color of between 1500-2700 Kelvins.

In a possible embodiment, the lighting device may be configured as a ring-shaped/annular clamshell design having a plurality of red LEDs, with "red" referring herein to light in the predetermined range of 580 nm to about 780 nm, e.g., some amount of yellow and/or orange visible light may be included in the range depending on the embodiment. The method may include clamping the lighting device directly to the stalk such that the lighting device circumscribes the stalk, and then directing the light from the red LEDs toward the lower minor height of the flowering plant for the duration of the flowering stage, e.g., at least 80 percent of or substantially all of the duration of the flowering stage.

The lighting device in this particular embodiment may have a center opening with a plurality of spring-loaded clamps. The surfaces of the spring-loaded clamps may include pads of foam or other sufficiently soft or compressible material suitable for protecting the stalk of the plant from damage from any contact with the lighting device. The spring force of the clamps is sufficient for securing the lighting device directly to the plant without damaging the stalk.

In other embodiments, another type of lighting device may be used as part of the method to irradiate the lower minor height of the flowering plant during the flowering stage. For example, an LED or high-pressure sodium (HPS) grow light or lights may be positioned at or near ground level and directed upward toward the leaves and floral blooms present below the lower minor height of the plant. Predominantly red light is emitted in the predetermined spectrum for the duration of the flowering stage. Such an embodiment may be used in conjunction with or separately from the clamp-on clamshell design noted above.

The above features and advantages and other features and advantages of the present disclosure are readily apparent from the following detailed description of the best modes for carrying out the disclosure when taken in connection with the accompanying drawings.

DETAILED DESCRIPTION

Figure 1:
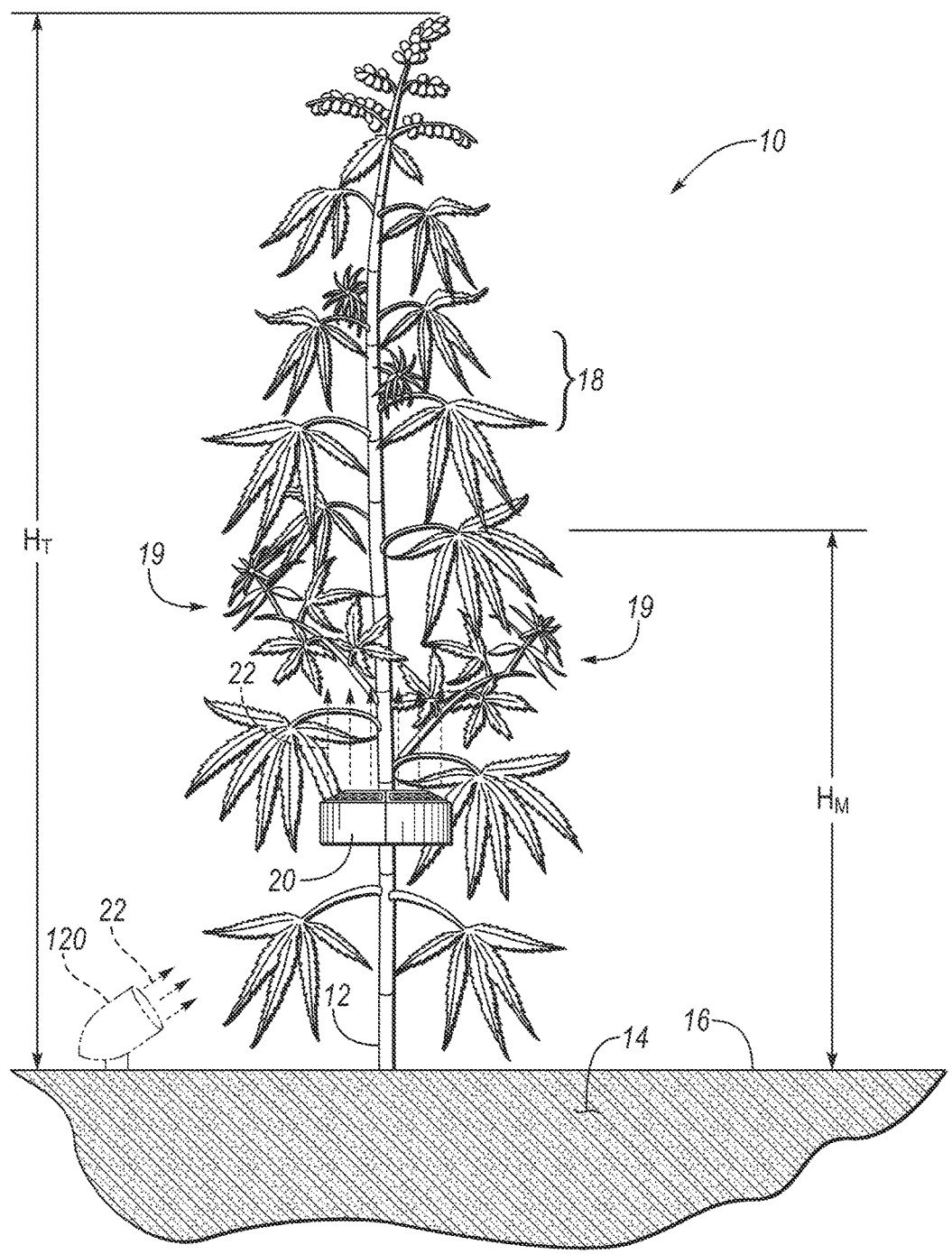
FIG. 1 is a schematic perspective view illustration of a flowering plant with an example clamp-on LED-based lighting device used in accordance with the present method.

Referring to the drawings, wherein like reference numbers refer to the same or similar components throughout the several views, an example flowering plant 10 is shown schematically in FIG. 1. The flowering plant 10 may be any variety of plant having a flowering stage as part of its lifecycle. For example, the flowering plant 10 may be any variety of cannabis plant as depicted, such as Cannabis Sativa, Cannabis Indica, or a hybrid variant thereof. The flowering plant 10 may also be a common floral plant such as an iris or lily plant, or a flowering fruit-bearing plant such as a tomato plant, without departing from the intended inventive scope. A cannabis plant as shown generically in FIG. 1 will be described hereinafter for illustrative consistency.

The flowering plant 10, which may be planted within soil 14 having a surface 16, has leaves 18 and, during the flowering stage of its lifecycle, a plurality of buds or floral blooms 19. The flowering plant 10 has a total height ($H_T$) as measured from the surface 16 of the soil 14 to the uppermost reaches of the canopy of the plant 10. The flowering plant 10 also has a lower minor height ($H_M$), which as defined herein refers to anything less than half of the total height ($H_T$). In a particular embodiment, for instance, the lower minor height ($H_M$) is less than about ⅓ of the total height ($H_T$).

As disclosed herein and as described below with reference to FIG. 2, a method 100 is disclosed for increasing the floral yield of the flowering plant 10 of FIG. 1 relative to existing cultivation and grow light-augmented processes. The method 100 includes irradiating the lower minor height ($H_M$) of the flowering plant 10 with predominantly red light (arrows 22) that is emitted via a predetermined lighting device 20, doing so specifically during the flowering stage of the lifecycle of the plant 10. As used herein, the term "predominantly red" refers to light falling in a defined spectrum wherein at least 80% of the emitted light from the lighting device 20 is in the predetermined range of 580 nm to 780 nm, and therefore always includes at least the red spectrum of visible light, and possibly limited amounts of yellow and/or orange light depending on the embodiment.

As shown in FIG. 1, the lighting device 20 is positioned with respect to the lower minor height ($H_M$) of the flowering plant 10. In an embodiment, the lighting device 20 may be clamped directly to a stalk 12 of the plant 10 as shown such that the lighting device 20 fully circumscribes the stalk 12. For instance, one may use the basic mechanical structure of a conventional patio umbrella light when modified and applied as set forth herein. Typically, such devices are used to project "white" or full-spectrum ambient light downward from an umbrella canopy toward a seating area, e.g., for improved ambience at night or in low lighting conditions. Alternatively, another lighting device 120 as shown in phantom may be positioned on or near the surface 16 of the soil 14, with the lighting device 120 likewise irradiating the lower minor height ($H_M$) with the predominantly red light (arrows 22) during the flowering stage of the lifecycle of the plant 10.

The lighting device 20 of FIG. 1 emits light (arrows 22) in a predetermined range of the electromagnetic spectrum, i.e., predominantly in the range of 580 nm to 780 nm. Unlike existing overhead grow light panels and other lighting technologies of the types noted above, which typically irradiate the entire flowering plant 10 from overhead or directly above the plant 10 with blue-red light or the entire spectrum of light during multiple stages of the lifecycle of the plant 10, the predetermined range of the electromagnetic spectrum as used herein includes light of which at least 80% of the energy or power output of the lighting device 20 has a wavelength range of between about 560 nm and about 740 nm, i.e., the yellow-orange-red spectrum. In another embodiment, the predetermined range of the electromagnetic spectrum is between about 585 nm and about 740 nm, i.e., the orange-red spectrum, or between about 625 nm and about 740 nm, about 625 nm and about 700 nm, or about 600 nm and about 700 nm, i.e., the red spectrum. The latter range may be used exclusively in a possible approach, as it is recognized herein that 600 nm to 700 nm coincides with a high level of absorbance of the light energy by Chlorophyll a and b. Embodiments may be envisioned that also provide the light (arrow 22) having wavelengths that fall within other parts of the electromagnetic spectrum, provided that at least 80% of the emitted light (arrow 22), i.e., substantially all of the emitted light, falls within the disclosed ranges and is thus substantially red light.

The lighting device 20 as used herein may be equipped with one or more LEDs. For instance, the lighting device 20 may be an annular clamshell design as shown in FIGS. 3A, 3B, 5, and 6 and explained below having a plurality of red LEDs, with the lighting device 20 in such an embodiment being clamped directly to the stalk 12 of the flowering plant 10. Alternatively, an LED or HPS grow light, such as the lighting device 120 shown in phantom in FIG. 1, may be positioned at or close to ground level, such as staked to the surface 16 of the soil 14, with light (arrows 22) emitted in the predetermined range of the electromagnetic spectrum and directed upward toward the lower minor height ($H_M$) of the flowering plant 10, i.e., into the lower canopy of the plant 10. Rather than pruning the floral blooms 19 in these lower areas of the plant 10 in the conventional manner, which can stress the flowering plant 10 and adversely affect the floral yield, the lighting device 20 is instead used for a targeted time and lifecycle stage, i.e., the flowering stage, specifically by irradiating the lower minor height ($H_M$) of the flowering plant 10.

Figure 2:
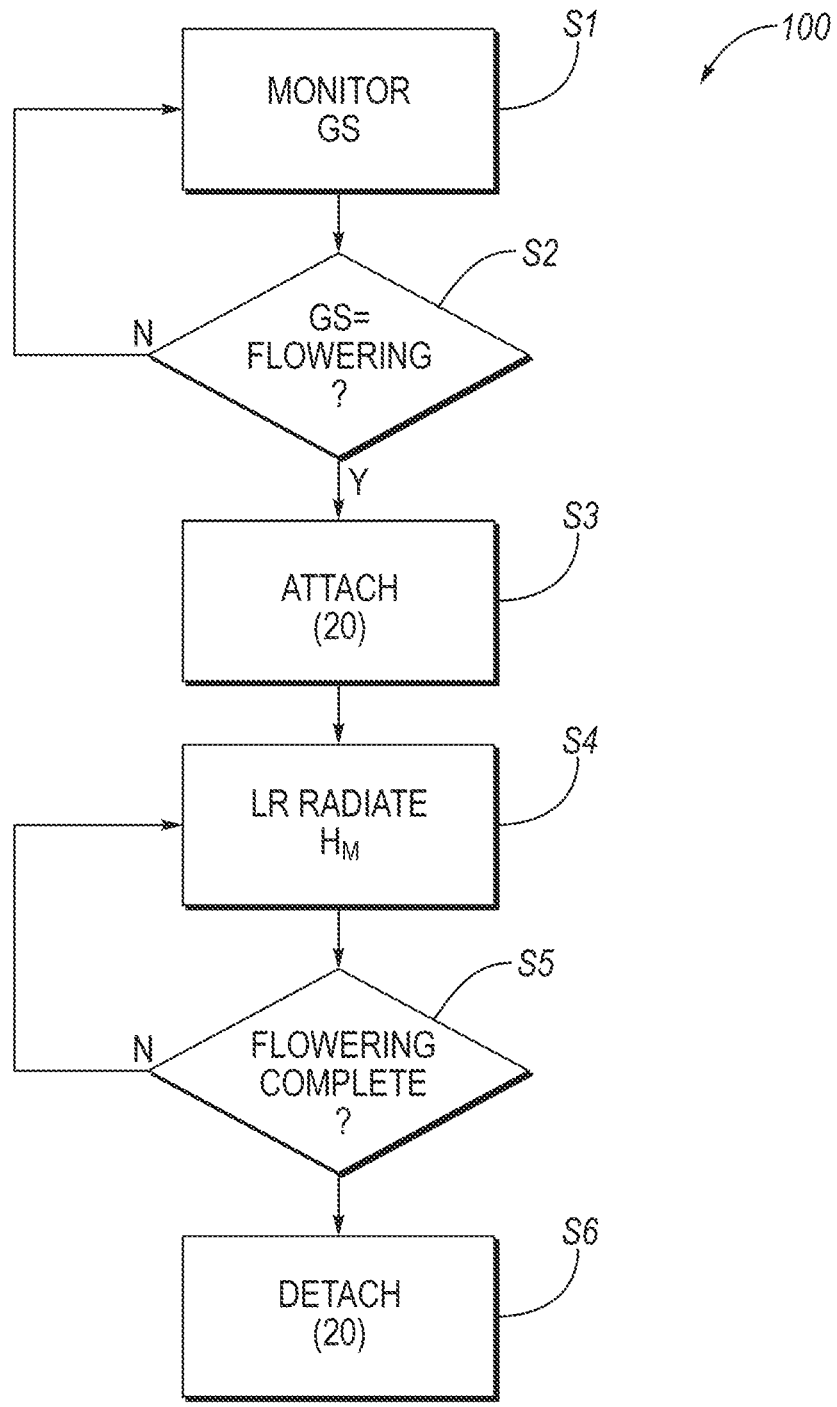
FIG. 2 is a flow chart describing an example method for increasing the floral yield of a flowering plant, such as the example flowering plant shown in FIG. 1.

Referring to FIG. 2, an example method 100 of increasing the floral yield of a flowering plant such as the flowering plant 10 of FIG. 1 begins with step S1. At step S1, the growth stage (GS) of the flowering plant 10 is carefully monitored over time. In a healthy flowering plant 10 of the type shown in FIG. 1, the seedling stage generally lasts between 3 to 6 weeks. The vegetative stage follows, with the flowering plant 10 growing rapidly during the vegetative stage. After about 4-6 weeks of growth in the vegetative stage, the flowering plant 10 will enter the flowering stage during which the flowering plant 10 begins to develop floral blooms 19. The actual amount of time a given plant 10 spends in a given lifecycle stage will vary with the plant variety and lighting conditions, and therefore the time ranges noted in step S1 are merely illustrative.

Step S2 includes determining if the present growth stage (GS) of the flowering plant 10 is the flowering stage. Steps S1 and S2 are repeated until the onset of the flowering stage, at which point the method 100 proceeds to step S3.

At step S3, the method 100 includes positioning the lighting device 20 described above with respect to the lower minor height ($H_M$) of the flowering plant 10. For example, step S3 may include clamping the lighting device 20 of FIGS. 3A, 3B, 5, and 6 directly to the stalk 12 at or below a lower half or lower third of a total height ($H_T$) of the flowering plant 10, as shown in FIG. 1, such that the lighting device 20 fully surrounds or circumscribes the stalk 12. The method 100 proceeds to step S4 after the lighting device 20 is suitably positioned.

Figure 3A:
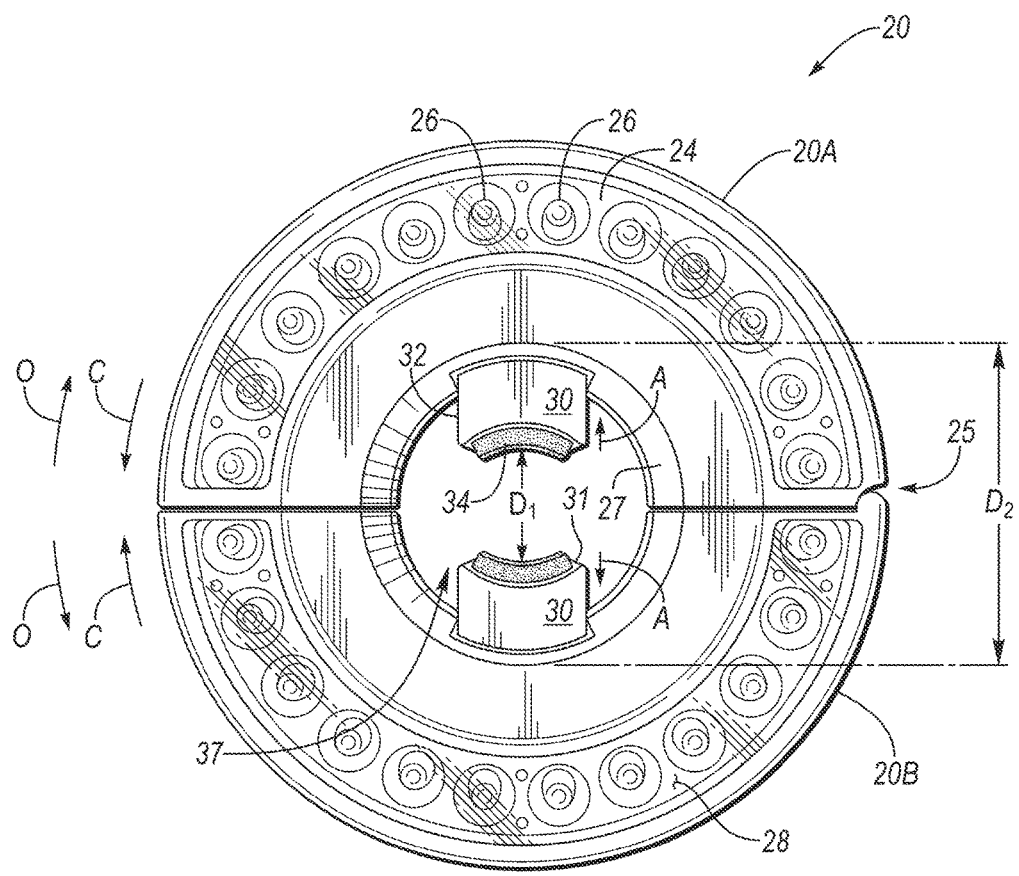
FIG. 3A is a schematic plan view illustration of the example clamp-on LED-based lighting device shown in FIG. 1 as it appears in a closed or installed position.

Step S4 entails irradiating the lower minor height ($H_M$) of the flowering plant 10 with light (arrows 22) from the positioned lighting device 20, i.e., directing the light (arrows 22) upward toward the undersides of the foliage of the flowering plant 10. In this manner, the flowering plant 10 is irradiated from below, i.e., from underneath with respect to the orientation of the plant 10 with respect to the surface 16 of the soil 14 shown in FIG. 1. The flowering plant 10 is irradiated with at least 80 percent of the light (arrows 22) in one of the predetermined ranges of the electromagnetic spectrum noted above. At least 95 percent of the emitted light (arrows 22) falls within the predetermined range in another embodiment. Step S4 may include energizing a pair of arcuate lighting arrays 24 of the lighting device 20 as shown in FIG. 3A, each having a plurality of red LEDs 26, such that the light (arrows 22 of FIG. 1) is emitted solely from the red LEDs 26. The color of the light (arrows 22) in this embodiment may be between 1500 and 2700 degrees Kelvin. The method 100 proceeds to step S5 as step S4 is ongoing.

At step S5, the method 100 includes determining if the flowering stage is complete. Signs of completion of the flowering stage will vary with the variety of the flowering plant 10 being cultivated. In the example of cannabis cultivation, the flowering stage may be considered complete when new floral blooms 19 no longer appear and/or when the pistils on the floral blooms 19 have darkened and begun to curl. The method 100 then proceeds to step S6 when the flowering stage is complete.

Step S6 includes detaching or removing the lighting device 20 from the flowering plant 10. Thereafter, the floral blooms 19 may be harvested. If cannabis is being grown, the floral blooms 19 form the consumable buds, and therefore such floral blooms 19 may be dried, cured, and processed for consumption. For floral plants yielding fruit, the floral blooms 19 may be left in place on the flowering plant 10 and allowed to continue to develop into fruit, which is then harvested at the appropriate time.

Figure 3B:
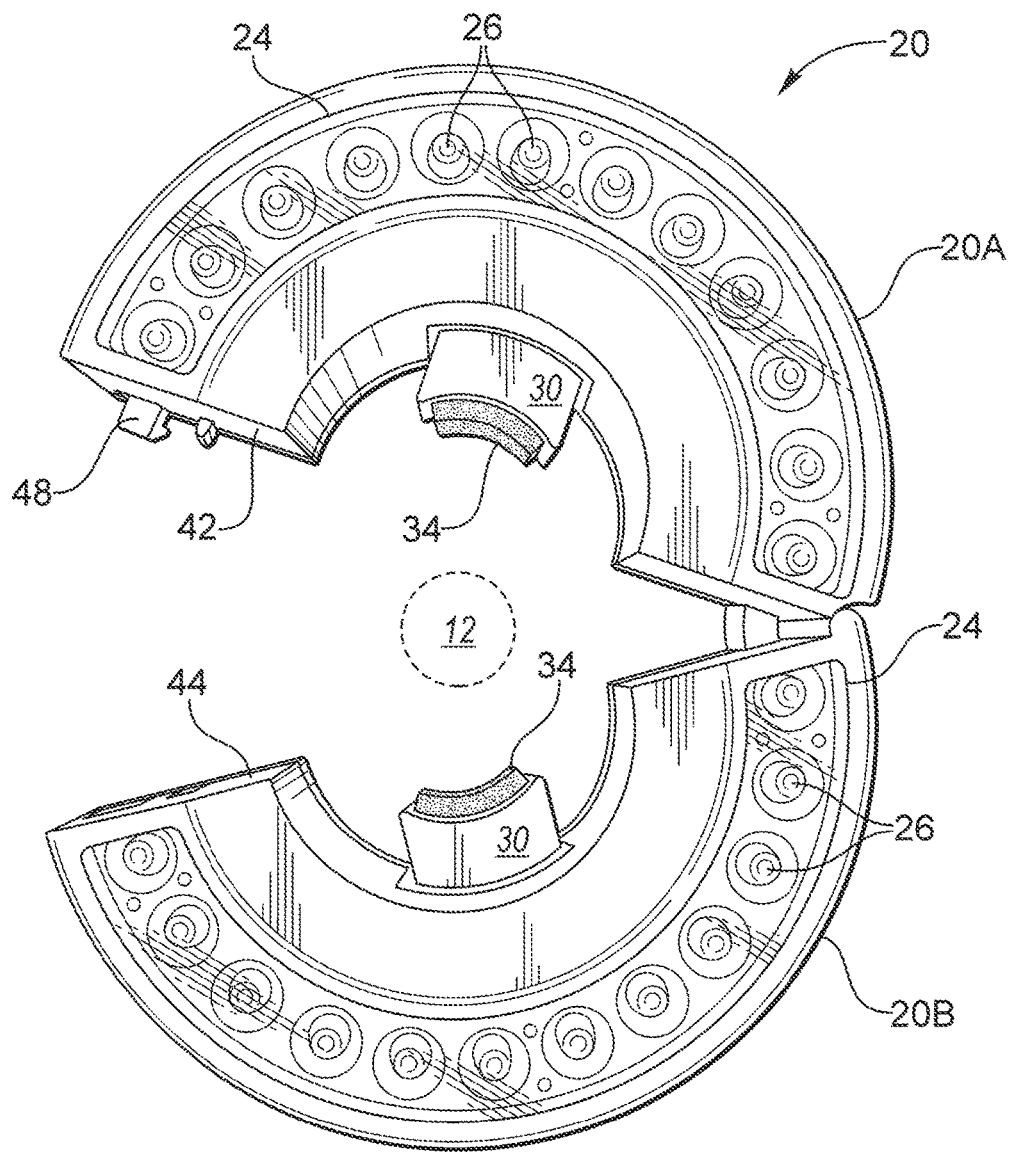
FIG. 3B is a schematic perspective view illustration of the example clamp-on LED-based lighting device of FIG. 3A as it appears in an open or uninstalled position.
Figure 5:
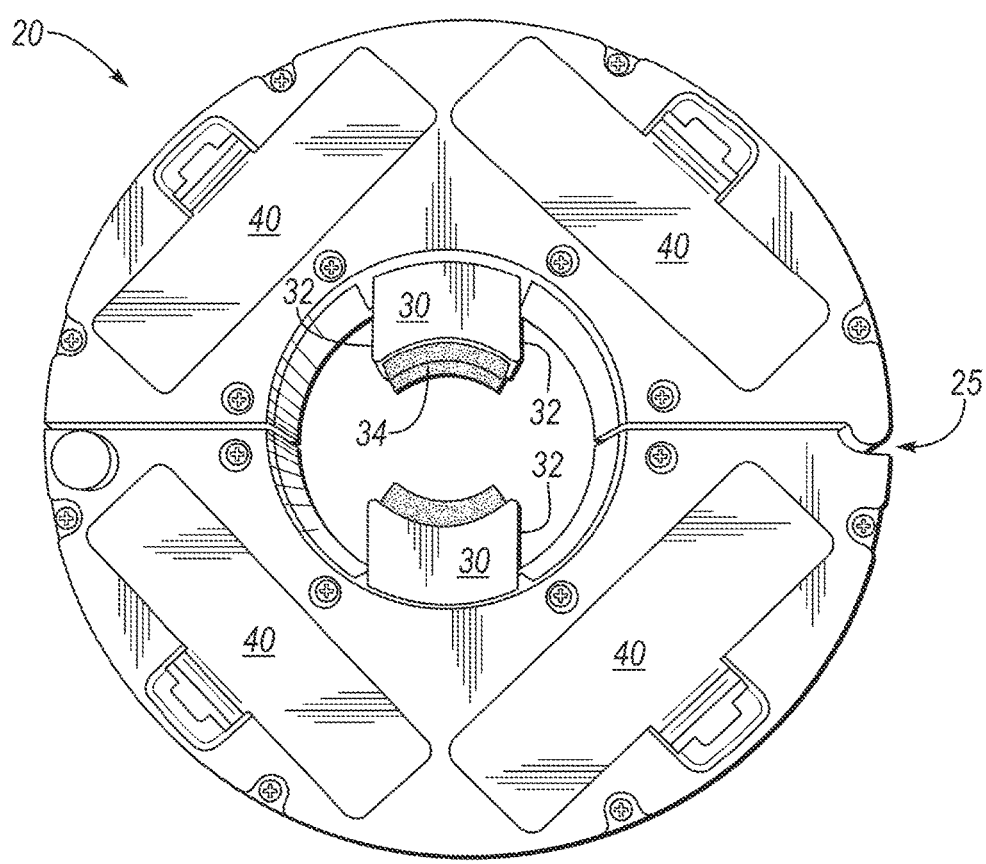
FIG. 5 is a schematic plan view illustration of the reverse side of the example lighting device shown in FIGS. 3A and 3B.
Figure 6:
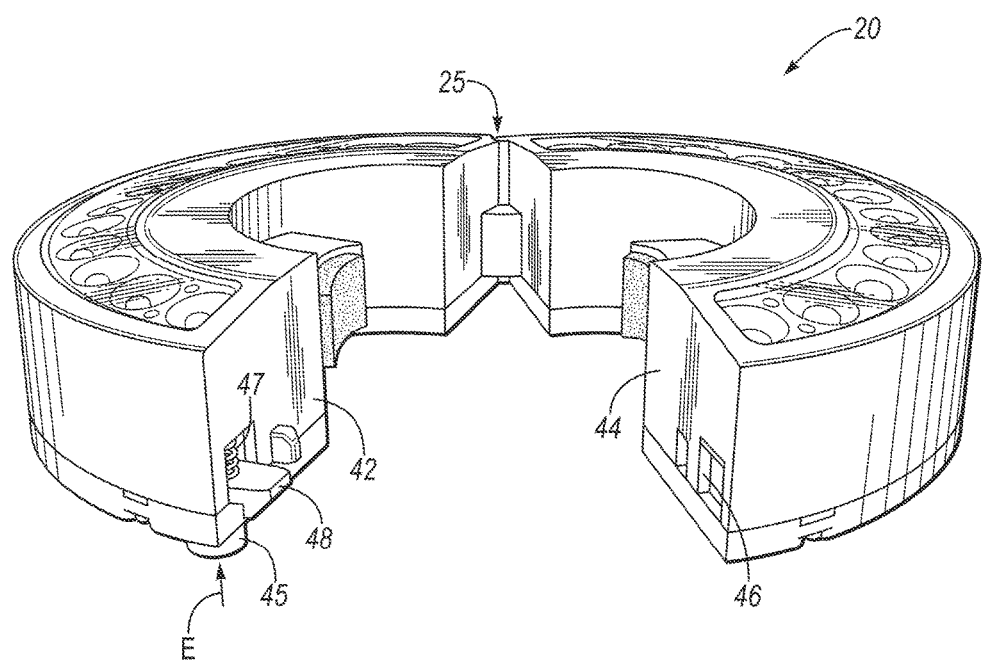
FIG. 6 is a schematic perspective view illustration of the example lighting device of FIGS. 3A, 3B, and 5 as it appears in an open or uninstalled position.

Referring to FIGS. 3A, 3B, 5, and 6, the lighting device 20 is shown in a possible embodiment as an annular clamshell design. Such a design may include respective first and second arcuate halves 20A and 20B joined together via a hinge 25 to form an annular or ring-shaped design. The first and second arcuate halves 20A and 20B may be respectively moved in the direction of arrows C into a closed position as shown in FIG. 3A or in the direction of arrows O to an opened position as shown in FIGS. 3B and 6.

As shown in FIG. 6, a latch release button 45 on the underside of the lighting device 20 may be biased by a latch spring 47. The latch release button 45 may be pressed as indicated by arrow E to release a latch 48 on the first arcuate half 20A of the lighting device 20 from a mating opening 46 of the second arcuate half 20B, with the latch 48 and the opening 46 housed or defined by respective axial walls 42 and 44 of the lighting device 20. The latch spring 47 biases the latch release button 45 such that a released position of the latch release button 45 corresponds to a default latched state of the lighting device 20.

Each of the respective first and second arcuate halves 20A and 20B of FIGS. 3A, 3B, and 6 may include an arcuate lighting array 24 in a possible embodiment. Each depicted arcuate lighting array 24 includes a plurality of red LEDs 26 providing light in the predetermined range of the electromagnetic spectrum as noted above, such that at least 80 percent of the light (arrows 22), or at least 95 percent of the light, from the lighting device 20 is in the predetermined range of 580 nm to 780 nm. For example, each arcuate lighting array 24 may have twelve red LEDs 26 arranged as shown. While shown as transparent for illustrative clarity, an arcuate diffuser panel 28 may be positioned adjacent to the LEDs 26 of each arcuate lighting array 24 to further diffuse the emitted light. As best shown in FIG. 5, which depicts the reverse side of the lighting device 20, i.e., the side facing the surface 16 in FIG. 1, may include a plurality of battery compartments 40. Each battery compartment 40 may house a conventional 1.5 VDC battery (not shown), with two such batteries driving a corresponding arcuate lighting array 24.

The lighting device 20 of FIGS. 3A, 3B, 5, and 6 may include a pair of spring-loaded clamps 30, e.g., arcuate or C-shaped clamps as shown, each biased by a spring force, e.g., a return force provided by an internal spring 39 described below. Each spring-loaded clamp 30 may include a body 32 that extends radially inward from an annular inner wall 27 of the lighting device 20 and a pad 34 disposed on a distal end 31 of the body 32. Pressure on a distal end 31 moves a given clamp 30 toward the annular inner wall 27 as indicated by arrows A. The lighting device 20 may be clamped directly to the stalk 12 of the flowering plant 10 shown in FIG. 1, e.g., by positioning the stalk 12 within an inner diameter $D_1$ between the pads 34 within a center opening 37 of the lighting device 20, with the center opening 37 having a diameter $D_2$ that is about twice as large as the diameter $D_1$. The lighting device 20 is thereafter secured to the stalk 12. Securement may be solely via the spring force provided by the clamps 30. Alternatively, legs or a stand (not shown) may be used to help support the weight of the lighting device 20.

Figure 4:
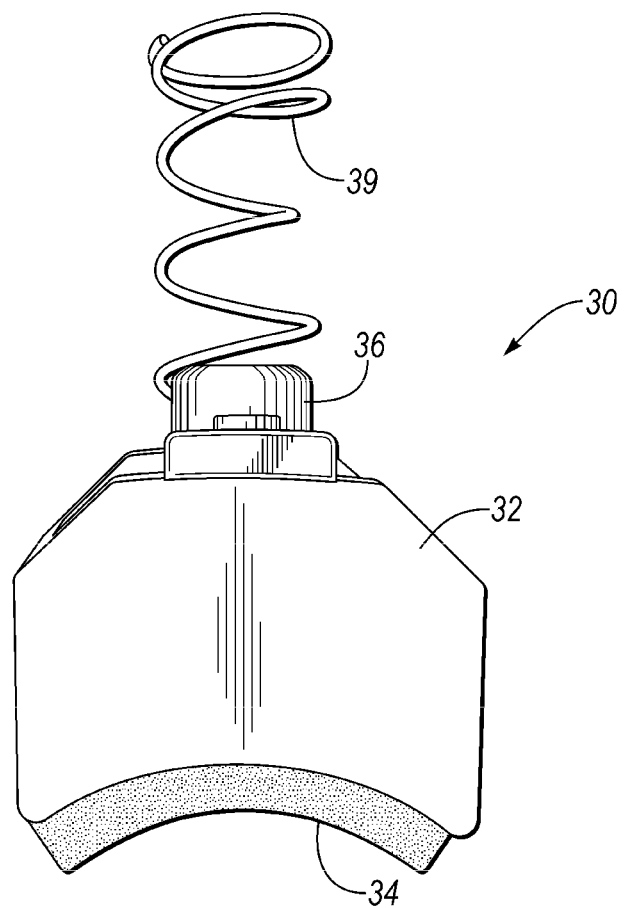
FIG. 4 is a schematic plan view illustration of a spring-loaded clamp usable with the example lighting device of FIGS. 3A and 3B.

Referring to FIG. 4, the pads 34 of each of the clamps 30 may be constructed of soft low-density foam or another suitable material that cushions the stalk 12 circumscribed by the lighting device 20, such that contact between the clamps 30 and the stalk 12 does not abrade or otherwise damage the stalk 12. Such pads 34 may have an adhesive backing that adheres to the body 32 of the clamps 30. A cylindrical boss 36 may be formed integrally with the body 32, and a spring 39 having a suitable spring force may be secured to the cylindrical boss 36 as shown. Pressure applied to the clamp 30 in the direction of arrow A of FIG. 3A, when the clamp 30 is properly installed in the lighting device 20, thus compresses the spring 39 and thereby adjusts the position of the clamps 30. This enables stalks 12 of different sizes to be securely clamped by the same lighting device 20. To account for larger flowering plants 10, the lighting device 20 may be constructed in different sizes, i.e., with larger and smaller diameters $D_2$ as shown in FIG. 3A.

All numerical values of parameters of quantities or conditions in this specification, including the appended claims, are to be understood as being modified in all instances by the term "about", whether or not "about" actually appears before the numerical value. The term "about" as used herein indicates that the stated numerical value allows for slight imprecision with respect to exactness in the stated value or range, i.e., reasonably close or nearly. If the imprecision provided by the term "about" is not otherwise understood in the art with this ordinary meaning, then "about" as used herein indicates at least variations that may arise from ordinary methods of measuring and using such parameters, for instance ±5 percent of the stated value or range. In addition, disclosure of ranges includes disclosure of all values and further divided ranges within the entire range.

While the best modes for carrying out the present disclosure have been described in detail, those familiar with the art to which this invention relates will recognize various alternative designs and embodiments within the scope of the appended claims.

The invention claimed is:

1. A method for increasing the yield of a flowering plant that is planted in soil having a surface and has a stalk, leaves, and floral blooms, the method comprising:
    positioning lighting devices with respect to the flowering plant at an onset of a flowering stage of the flowering plant, wherein the flowering plant has a total height and a lower minor height, the lower minor height being less than half of the total height of the flowering plant, wherein positioning the lighting devices includes positioning, at the onset of the flowering stage, a first one of the lighting devices directly on the stalk and a second one of the lighting devices on or near the surface of the soil; and
    irradiating the flowering plant upward toward the lower minor height, via the lighting devices, with light in a predetermined range of the electromagnetic spectrum for a duration of the flowering stage of a lifecycle of the flowering plant, wherein at least some of the leaves and the floral blooms are located below the lower minor height, such that the light is directed upward toward the leaves and the floral blooms located below the lower minor height, and wherein at least 80 percent of the light has a wavelength in the predetermined range of 580 nm to 780 nm.

2. The method of claim 1, wherein at least 95 percent of the light has a wavelength in the predetermined range.

3. The method of claim 1, wherein the light has a color of between 1500 and 2700 degrees Kelvin.

4. The method of claim 1, wherein the first one of the lighting devices is an annular clamshell having spring-loaded clamps each biased by a respective spring force, and wherein positioning the first one of the lighting devices on the stalk of the flowering plant includes clamping the first one of the lighting devices directly to the stalk solely via the respective spring force of each of the spring-loaded clamps, such that the stalk is fully circumscribed or surrounded by the first one of the lighting devices.

5. The method of claim 1, wherein the predetermined range of the electromagnetic spectrum is between 585 nm to 740 nm.

6. The method of claim 5, wherein the predetermined range of the electromagnetic spectrum is 600 nm to 700 nm.

7. The method of claim 1, wherein the second one of the lighting devices is an LED or a high-pressure sodium lighting device.

8. The method of claim 1, wherein the first one of the lighting devices includes a pair of arcuate lighting arrays each having a plurality of red LEDs, and wherein irradiating the flowering plant includes energizing the pair of arcuate lighting arrays such that at least some of the light is emitted from the plurality of red LEDs.

9. A method for increasing the yield of a flowering plant that is planted in soil having a surface, and that has a stalk, leaves, and floral blooms, the method comprising:
    clamping an annular clamshell-shaped lighting device directly to the stalk of the flowering plant within a lower third of a total height of the flowering plant, such that the stalk is fully circumscribed or surrounded by the annular clamshell-shaped lighting device, wherein the annular clamshell-shaped lighting device includes red LEDs; and
    irradiating the leaves and the floral blooms of the flowering plant from below, via the annular clamshell-shaped lighting device, with red light in a predetermined range of the electromagnetic spectrum for a duration of a flowering stage of a lifecycle of the flowering plant, such that at least 80 percent of the light from the red LEDs of the annular clamshell-shaped lighting device is in the predetermined range, and the predetermined range is 580 nm to 780 nm.

10. The method of claim 9, wherein at least 95 percent or more of the light is in the predetermined range.

11. The method of claim 10, wherein the light has a color of between 1500-2700 degrees Kelvin.

12. The method of claim 9, wherein the annular clamshell-shaped lighting device includes a plurality of C-shaped, spring-loaded clamps each biased by a respective spring force, and wherein clamping the annular clamshell-shaped lighting device to the stalk of the flowering plant includes securing the annular clamshell-shaped lighting device directly to the stalk solely via the respective spring force of each of the C-shaped, spring-loaded clamps.

13. The method of claim 9, wherein the predetermined range is 585 nm to 740 nm.

14. The method of claim 13, wherein the predetermined range is 600 nm to 700 nm.

15. The method of claim 9, the method further comprising: positioning an LED or high-pressure sodium lighting device on or near the surface of the soil; and
   irradiating the leaves and the floral blooms of the flowering plant from below with light from the LED or high-pressure sodium lighting device in the predetermined 580 nm to 780 nm range of the electromagnetic spectrum.

16. The method of claim 9, wherein irradiating the leaves and the floral blooms of the flowering plant from below includes energizing a pair of arcuate lighting arrays of the annular clamshell-shaped lighting device, each having a plurality of the red LEDs, such that at least some of the light is emitted from the plurality of red LEDs.

\* \* \* \* \*